United States Patent
Tsai (10) Patent No.: US 7,831,672 B2
(45) Date of Patent: Nov. 9, 2010

(54) SYSTEMS AND METHODS FOR SECURING COMPUTERS

(75) Inventor: Hungchou Tsai, Cupertino, CA (US)

(73) Assignee: Bao Tran, Saratoga, CA (US)

(*) Notice: Subject to any disclaimer, the term of this patent is extended or adjusted under 35 U.S.C. 154(b) by 265 days.

(21) Appl. No.: 11/964,636

(22) Filed: Dec. 26, 2007

(65) Prior Publication Data
US 2009/0013374 A1 Jan. 8, 2009

Related U.S. Application Data

(63) Continuation of application No. 09/972,596, filed on Oct. 5, 2001, now abandoned.

(51) Int. Cl.
*G06F 15/16* (2006.01)
(52) U.S. Cl. ......................... 709/206; 709/224
(58) Field of Classification Search ............... 709/206, 709/200–203, 217–227
See application file for complete search history.

(56) References Cited

U.S. PATENT DOCUMENTS

| | | | | |
|---|---|---|---|---|
| 5,623,600 A * | 4/1997 | Ji et al. | | 726/24 |
| 6,785,732 B1 * | 8/2004 | Bates et al. | | 709/232 |
| 7,072,942 B1 * | 7/2006 | Maller | | 709/206 |
| 2003/0065941 A1* | 4/2003 | Ballard et al. | | 713/201 |
| 2004/0054498 A1* | 3/2004 | Shipp | | 702/182 |
| 2005/0081059 A1* | 4/2005 | Bandini et al. | | 713/201 |
| 2005/0086499 A1* | 4/2005 | Hoefelmeyer et al. | | 713/188 |
| 2010/0169970 A1* | 7/2010 | Stolfo et al. | | 726/22 |

FOREIGN PATENT DOCUMENTS

| | | | |
|---|---|---|---|
| AU | 200165621 A * | 3/2002 | |
| KR | 2001105618 A * | 11/2001 | |

* cited by examiner

*Primary Examiner*—Moustafa M Meky
(74) *Attorney, Agent, or Firm*—Tran & Associates (57) ABSTRACT

Systems and methods are disclosed for avoiding electronic mail (email) attacks on a computer by downloading one or more emails in virtual-copy format to prevent the one or more emails from executing; determining whether a potentially infected email is in the one or more emails; and displaying the potentially infected email to a user and providing a user interface to allow the user to select and delete the infected email prior to downloading emails to the user's computer.

20 Claims, 5 Drawing Sheets

SYSTEMS AND METHODS FOR SECURING COMPUTERS

This application is a continuation of application Ser. No. 09/972,596 filed Oct. 5, 2001, now abandoned the content of which is incorporated by reference.

COPYRIGHT RIGHTS

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The present invention relates to systems and methods for protecting a computer against a virus or a worm.

With the widespread use of computers and computer networks such as the Internet, computer viruses have become problematic to computers and computer users. Such viruses are typically found within computer programs, files, or code and can produce unintended and sometimes damaging results. These viruses can be transmitted by disk, electronic mail (e-mail), radio wave, light wave, or other computer readable media. For example, emails transmit electronic messages from one computer to another. These messages may be simple text messages or more complex messages containing documents and data of various types. The transmission of e-mail messages may range from transmission over a short distance, such as over a local area network between employees in adjoining offices, to transmission over extremely long distances, such as over the global Internet between users on different continents. The global nature of emails makes them easy carriers for viruses.

One type of virus produces copies of it in other programs, allows the programs to perform their regular operations, and surreptitiously performs other, unintended actions. Other types of viruses include, without limitation, the following: worms, logic bombs, time bombs, trojan horses, and any malicious program or code residing in executable programs, macros, applets, or elsewhere. While advances have been made in the detection of viruses, the proliferation of computers and the increasing interconnection of, and communication between, computers have also increased the opportunities for the spread of existing viruses and the development of new computer viruses. Thus, the number and type of viruses to which a computer or computer system is potentially exposed is ever changing. This is one reason that the information used to detect viruses requires seemingly constant revision and augmentation in order to detect the various strains of viruses. For example, a virulent virus that first appeared in September 2001 is Nimda (a.k.a. W32/Nimda@MM or Code Rainbow), a worm that attacks Microsoft Windows systems. Nimda attacks a variety of both server and client vulnerabilities and even the back doors left by Code Red II. Nimda can attack via email. It uses the Internet Explorer exploit mentioned in MS01-020 to cause Outlook to automatically execute the worm on a users system. Nimda can attack via web browser. If a user visits an infected web server and does not have patch MS01-020 applied their machine can be infected. Nimda can attack using holes opened by previous worms. Code Red II opened a variety of holes in system, presumably for use by nefarious individuals to control the target machine. Nimda looks for these holes. If they are present it uses them to install itself on the machines in question. Web servers are attacked using a wide variety of previously known and patched holes. If Nimda detects the presence of file shares on a remote machine and it has access rights it will infect the machine through those shared files.

As another example, Melissa is a computer virus launched when a user opens an infected Microsoft Word 8 or Word 9 document contained in Microsoft's Office suite of software products. The virus prompts Microsoft's Outlook e-mail program to send an infected document to addresses in a victim's Microsoft Outlook address book. The e-mail can appear to be from a boss, co-worker, or friend. Even if the user doesn't use Outlook, the virus can infiltrate the default Word document template "Normal.dot" and send the virus to anyone receiving their Word documents. The virus also attacks the registry for Word and changes security settings that prevent the Word macro warning from appearing. The original virus is sent via e-mail with the subject line "Important Message From . . . " and then automatically fills in the user's name. The text inside the message reads "Here is the document that you asked for. Don't show anyone else ;-)." The message includes an attached document of pornographic Web sites called "list-.doc."

There are various methods for detecting viruses. One method of detection is to compare known virus signatures to targeted files to determine whether the targeted files include a virus signature and, thus, the corresponding virus. The comparison data used for virus detection might include a set of such known virus signatures and, possibly, additional data for virus detection. Typically, the comparison data is maintained in a computer storage medium for access and use in the detection of viruses. For example, for a personal computer the comparison data might be stored on the computer's hard disk. Periodically, comparison data updates are provided to detect new or different forms of viruses. The comparison data updates are typically provided on some source storage medium for transfer to the storage medium used to maintain the comparison data. For example, an update might be provided on a floppy disk so that a personal computer user can transfer the comparison data update from the floppy disk to the computer hard disk to complete the update.

The comparison data is essentially discrete and static. That is, all of the information used for the detection of viruses generally remains constant unless it is updated or altered by the user or other relevant party or action. This can be problematic because the quality of information used to detect viruses is reliant upon some form of comparison data maintenance. Another problem with updatable comparison data is that the comparison data can quickly lose its efficacy due to the existence of new and different viruses. Thus, while a periodic update might seem effective, there is no telling how many new and different viruses could be produced in the interim. Still another problem with comparison data updates is that a transfer of an entire replacement set of data, or at least a transfer of all the new virus detection data, is typically undertaken in order to complete the update. Whether an entire replacement or all of the new virus detection data is involved, a significant amount of data must be transferred for the update. More specifically, if a user updates her virus detection information using, for example, an update provided on a floppy disk, at least all of the new virus detection information is transferred from the floppy disk to the appropriate medium.

Regardless of the update source, the problems of updatable comparison data remain. Specifically, the user, administrator, or other relevant party is still typically responsible for accessing and updating the comparison data, the comparison data can quickly and unpredictably lose its efficacy, and a significant amount of data must be transferred from the source to the storage medium used for the comparison data. Indeed, the amount of data to be transferred may be more problematic where internet resources are the source of the comparison data update since a significant amount of computational resources would be used to complete the update.

Another problem in the detection of viruses is that conditions vary from computer to computer. Thus, a first computer or medium could require a first type of scanning while another computer or medium, even one in the same network as the first, could require a second type of scanning. In these instances, virus scans can be overinclusive in that the scanning for viruses that could not possibly reside at the computer, and can be underinclusive if an exhaustive scan for the types of viruses likely to reside at the computer, based upon the conditions presented at the computer, is not undertaken. To adequately perform a virus scan according to the conditions particular to a computer, a user or other relevant party typically must configure the scan. This can be problematic because of reliance upon party input. Additionally, the conditions pertaining to a particular computer and the requisite type of scanning can change.

With the increasing interconnection and communication between computers, the requirements for maintaining computers residing on a computer network have also increased. Again, maintenance is typically undertaken directly by a person, such as the network administrator, using resources which are locally available to the network administrator. For example, in the treatment of computers on a local area network for viruses, an administrator could commonly configure the computers to access locally available virus scanning resources. This maintenance scheme is problematic in its reliance upon updates, its failure to adapt to changing conditions, and its failure to make adequate use of resources external to the local area network. Today, popular operating systems and software such as the Microsoft system and application is tied into company network and the Internet. Since many features and automation are built in the system, when a virus infected email is received by Microsoft's Outlook application, the virus can leverage windows system resource to attack. The virus abuse user's system and Outlook address book to spread itself and to impact other system connected to the Internet. The global nature of the Internet means that one virus email can create a large amount of network traffic that jams the server that the user connects to as well as the Internet. Such virus can be destructive and can cause lost business due to computer downtime.

SUMMARY

In one aspect, a method for avoiding electronic mail (email) attacks on a computer includes downloading one or more emails in virtual-copy format to prevent the one or more emails from executing; determining whether an infected email is in the downloaded one or more emails; and disposing of the infected email.

Implementations of the above aspect may include one or more of the following. The method allows non-infected emails to be accessed. The method includes downloading non-infected emails to an email software such as Microsoft Outlook. The method includes parsing the downloaded virtual-copy format emails to determine whether the emails are secure. Potentially infected emails are determined based on one or more of the following: an email from field, an email to field, and an email subject field. The method includes applying a security policy that specifies characteristics of potentially infected emails. The method includes removing one or more potentially infected emails based on the security policy. The system can display a summary for each email.

In another aspect, a system for avoiding electronic mail (email) attacks on a computer includes means for downloading one or more emails in virtual-copy format to prevent the one or more emails from executing; means for determining whether an infected email is in the downloaded one or more emails; and means for disposing of the infected email.

Advantages of the above systems and methods may include one or more of the following. The system uses a proactive approach to capture information from a copy of a user's emails. A Smart-Diagnosis engine analyzes the emails and indicates potentially infected email(s) for the user. Then user can manually remove those email and kill the viruses before they infect the user's computer. The system allows the user to subscribe to a predetermined security policy. The system allows the user to view emails before they come into user system. A smart user interface is provided to indicate potentially-infected emails. The user interface shows email attachment full file name, email size. The user interface also provides a history log file view. The user can review a historical email log file and can delete the email log file view as well as review the deleted email log file. Further, the user can schedule the system to run and perform Smart-Diagnosis.

Other advantages may include one or more of the following. The system co-exists with any other email application such as Microsoft Outlook. The user can screen emails, can remove email, and read emails in a secure manner. The user can use his or her favorite email application to safely read emails and associated attachments. Since the virus or worm does not get through, the virus or worm cannot propagate itself by accessing the user's address book in Outlook and sending copies of itself to each entry in the address book.

The system allows a user to relate all of the steps in avoiding virus infections and to save all of the information regarding each of the various steps in one convenient and easily accessible location. The system is also efficient and low in operating cost. It also is highly responsive to user demands.

Other advantages and features will become apparent from the following description, including the drawings and claims.

DESCRIPTION

Referring now to the drawings in greater detail, there is illustrated therein structure diagrams for a virus avoidance system and logic flow diagrams for the processes a computer system will utilize to complete various anti-virus transactions. It will be understood that the program is run on a computer that is capable of communication with consumers via a network, as will be more readily understood from a study of the diagrams.

Figure 1:
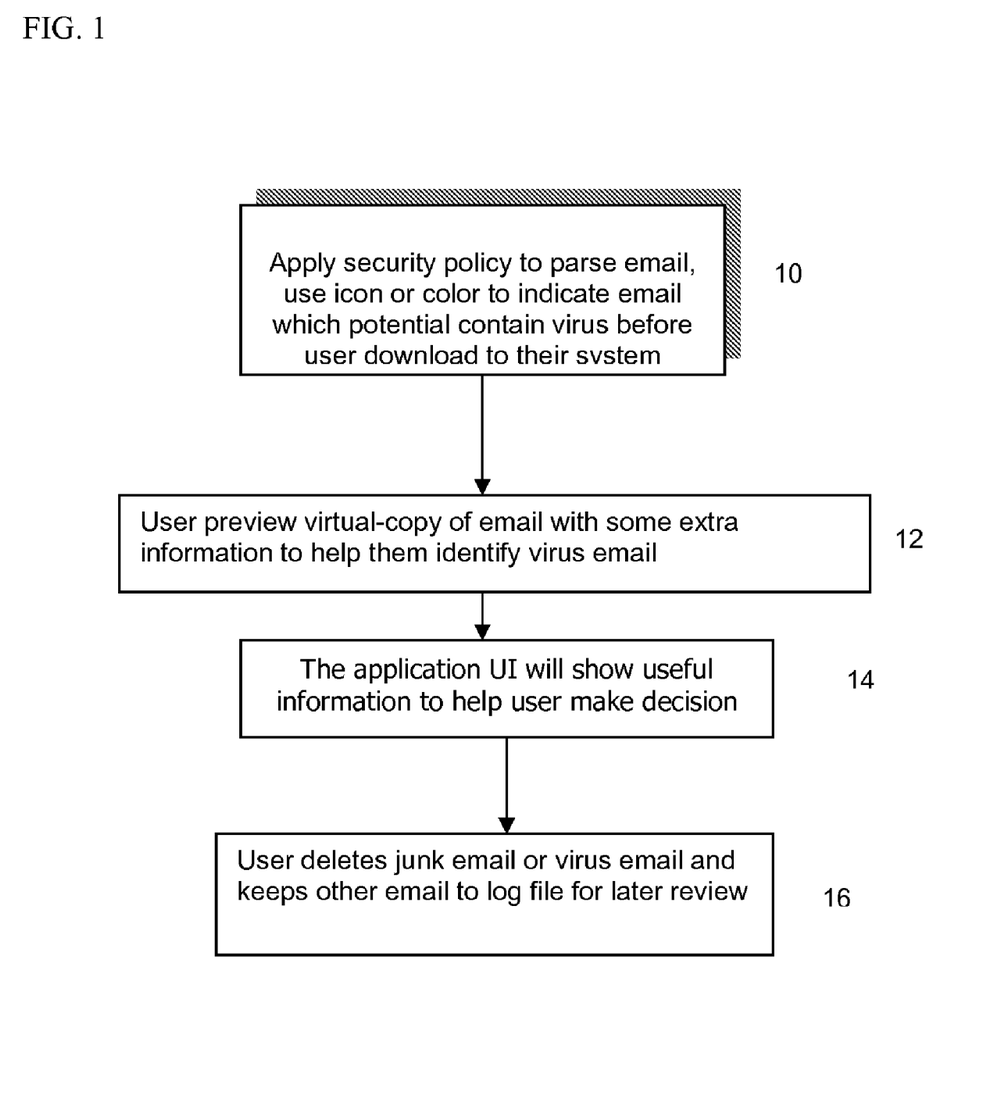
FIG. 1 shows an exemplary process that alerts users to potentially dangerous emails before they download the emails into their email software.

Referring now to FIG. 1, an exemplary process 10 alerts users to potentially dangerous emails before they download the emails into their email software. First, the user previews his or her emails (step 12). The process 10 applies one or more rules to identify potentially dangerous emails and highlights them for the user to decide (step 14). The user can keep the email or delete the email (step 16). Upon reviewing the batch of emails, the user can download the emails to his or her email software. The purpose of the process 10 is not to detect or repair specific viruses, but to alert users to the fact that they are opening emails that could contain viruses or worms and to allow uses to delete questionable emails.

Figure 2:
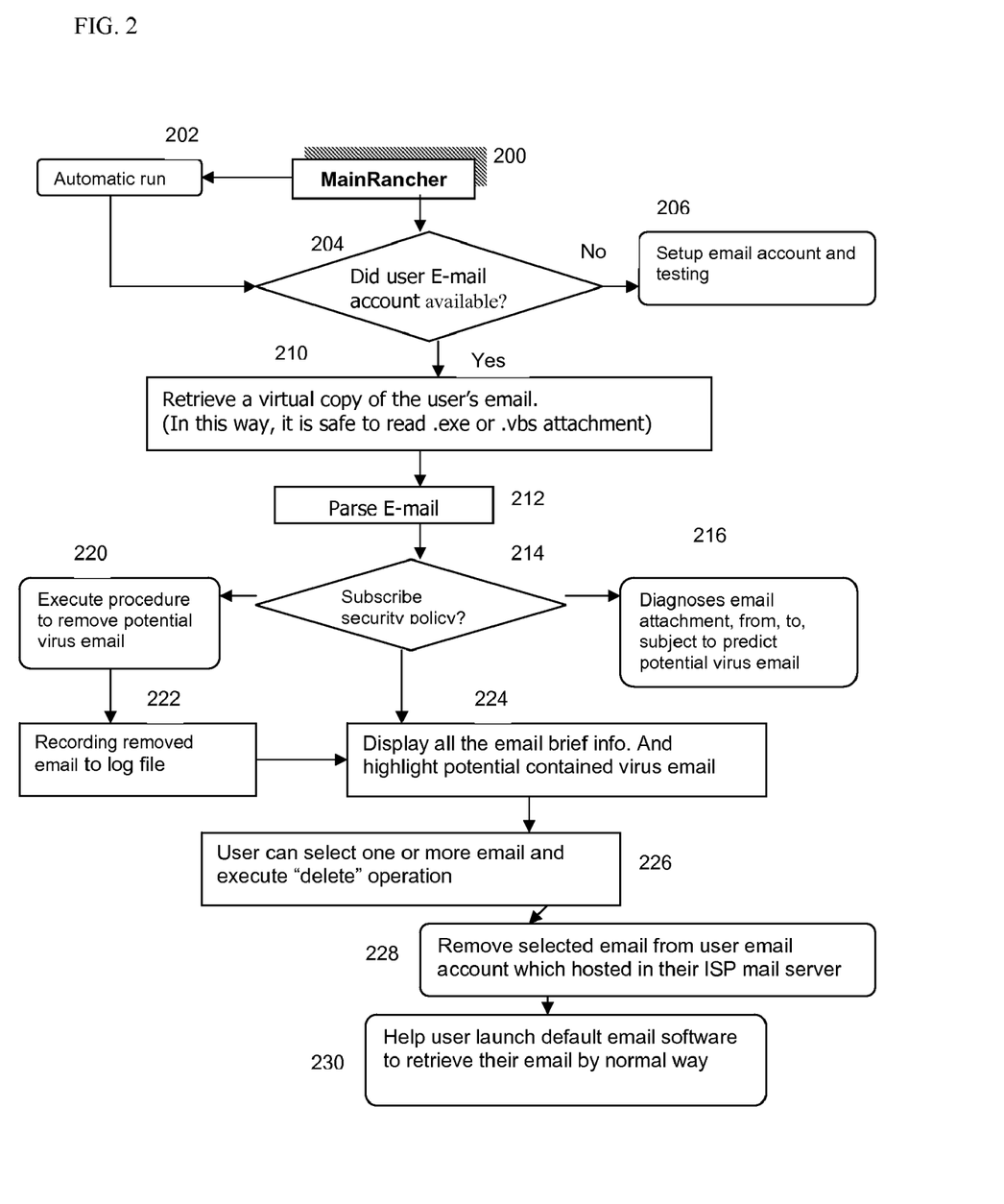
FIG. 2 shows an exemplary process to detect and delete emails potentially infected with a virus or a worm.

Referring now to FIG. 2, an exemplary process 200 to detect and delete emails potentially infected with a virus or a worm. E-mail is popular because it is a quick, convenient, and easy way to exchange information and communicate with others. E-mail offers numerous advantages over other forms of communication. For example, e-mail is less intrusive than a telephone call because the recipient of an e-mail message may wait until a convenient time to retrieve and respond to the message rather than being immediately interrupted. Another advantage of e-mail is the ability to communicate with large groups of people by sending a single e-mail message to multiple recipients. Still another advantage of e-mail is the ability of attaching documents in electronic format to an e-mail message. Viruses and worms typically disguise themselves in the form of executables or programmable macros embedded in the emails.

The process 200 allows a user to preview incoming emails and enables the user to delete potentially dangerous emails. The process 200 can be run automatically (step 202) or can run upon command. The process 200 determines whether the user has set-up one or more email accounts (step 204). If no, the user is prompted to set-up one or more email accounts and these accounts can be tested to ensure that they are properly set up (step 206). Typically, the email accounts are specified by providing the user's email address and the transmit/receive addresses for a mail server maintained by the user's Internet Service Provider (ISP).

From step 204, if one or more email accounts are available, the process 200 retrieves (downloads) emails from the mail server in a virtual-copy format (step 210). The virtual-copy format allows the downloaded content to be safely analyzed in that virtual-copy format data cannot be executed.

Next, each email is parsed (step 212). The process 200 then checks whether the user has subscribed to a security policy that specifies whether the user wants the process 200 to automatically remove emails fitting specific criteria indicative of a virus or a worm embedded therein (step 214). If no security policy has been specified, the process 200 diagnoses emails attachment for other hints of viruses or worms based on the attachment type and the emails' fields such as the From field, the To field, and the Subject field, among others (step 216).

From step 214, if the security policy has been specified, the process 200 removes email(s) with potentially infected viruses or worms (step 220) and records the removal into a log (step 222).

From steps 216 or 222, the process 200 displays brief information for each email and highlights potential emails that contain worms or viruses (step 224). The user can select one or more emails and execute a Delete operation (step 226). Based on the user's instructions, the process 200 accesses the user's mail server and removes the selected emails stored in the user's account at the mail server hosted by the user's ISP (step 228). Next, the process 200 launches the user's default email software to retrieve the safe emails (step 230).

A Smart-Diagnosis engine analyzes the emails and indicates potentially infected email(s) for the user. The engine can be an "expert system" or an intelligent computer program that uses knowledge and inference procedures to solve problems such as virus detection. An expert system includes a knowledge base of domain facts and heuristics associated with the problem. The facts constitute a body of information that is widely shared, publicly available, and generally agreed upon by experts in a field. The "heuristics" are mostly private, little-discussed rules and strategies of good judgment, plausible reasoning, and good guessing that characterize expert-level decision-making and drastically limit search in large problem spaces. This knowledge is used by the system in reasoning about the problem. The expert system also includes a control structure for symbolically processing and utilizing the information stored in the knowledge base to solve the problem. This control structure is also commonly referred to as the inference engine. A global data base serves as a working memory to keep track of the problem status, input data, and relevant facts and history of the solution progression in detecting and removing harmful viruses and worms. The system also includes an explanation systems to allow the user to challenge and examine the reasoning process underlying the system's answers. This includes a user friendly interface to facilitate user interaction with the system. The expert system also includes a knowledge acquisition system to facilitate the addition of new knowledge on viruses and worms into the system. Knowledge acquisition is an ongoing process, thus the knowledge must evolve over time through several iterations of trial and error. This interactive transfer of expertise from a human expert to the expert system is required in order to achieve an operationally acceptable level of performance. Although expert system is discussed, the Smart Diagnosis engine can also be a neural network, a fuzzy logic or a statistical based learning system.

In one embodiment, the email software is Microsoft's Outlook software, published by Microsoft Corporation of Redmond, Wash. The Outlook client application is divided into several modules, including a calendar manager, a task list manager, a contact manager, a message manager (e-mail), and a notes manager. All folders (containers) contain objects, or items such as e-mail items, appointment items, task items, address items, etc. Items have a set of fields and a behavior associated with them. For example, an e-mail item has To, From, CC, Subject, date and time fields among others. The behavior of e-mail items includes knowledge of what it means to Forward or Reply/Reply All. A user stores information in the form of items. Items, in turn, reside in folders. A message is a collection of properties. Items are composed of fields. For example, the "subject" in an e-mail note would be a field called "subject" in the e-mail item. In the Outlook program, every item is initially created from a template. A template is the "mold" from which new items are made and as such describes the fields and the item—the data types, default values, formatting rules, etc. For example, there would be a default template for each kind of item listed above: appointments, to-do items, notes, e-mail messages, among others. For additional information regarding Outlook program, the reader may refer to the documentation that is distributed with the Outlook program.

Pseudo-code for the process 200 is shown below:

```
Step 1.0
IF user Pop3 mail server information is available THEN
    Run main application
ELSE
    Run "Setup E-mail account and testing" property page
    IF user fill in Pop3 mail server address, username and password THEN
        Recommend user press "test" button to test POP3 E-mail account
        and if so:
            Issue win socket command
            Interpret receiving raw data from POP3 mail server
            Send back user information and password
            Check receiving data
            IF no error found THEN
                Finish test and show message to user
                Close win socket
            ELSE
                Display error message and remind user try again
            END IF
    ELSE
        Warn user to complete test, otherwise emails may not be retrieved
        IF user's pop3 information not available THEN
            Disable certain functions to protect itself
        END IF
    END IF
END IF
STEP 1.1
    IF user subscribe automatic check in certain interval time THEN
        Use user's POP3 information and run whole process,
        Include automatic
            Retrieve user's email
            Parse E-mail
            Diagnoses email component, such as To, From, Subject,
                Attachment, Mail body
            Check user subscribe security policy
            Display all the email data with intelligent format to help
                user do the final scan
            Repeat step 2, 3 and 4
    END IF
STEP 2
    IF user finish test POP3 email account THEN
        Retrieve email by POP3 protocol in raw format
        Save incoming received data to file stream and temporary store in
            user machine
        Store all the email data in virtual-copy format for safe accounting
in
            "Diagnoses"
    END IF
STEP 3
    IF retrieve email successful THEN
        Parse E-mail virtual-copy format data
        Exact E-mail header like To, From, Subject, Cc, Bcc, Attachment
        and Body text
        Diagnose To, From and Subject data to detect virus pattern or
behave
        Diagnose Attachment file to detect any potential auto run pattern
    or behave
IF user subscribe security policy THEN
    Execute security check and automatic "Remove" those campaign email
which fit in check condition
    Write the log file for user reference
END IF
    END IF
STEP 4
    IF no error from parse email THEN
        According parse result, display different level of warning such as
        virus icon, attachment icon and red background color to indicate
        suspicious emails
    END IF
STEP 5
    User can
a.  Remove suspicious email
b.  Remove junk email as well
c.  Remove unknown "From" email
d.  Remove mail which its To or Cc contain email address and similar name
email address
e.  Capture email information to log file
```

-continued

```
STEP 6
    User can launch Outlook or other email application to read, send and manage their
email
    Property page 1
        User can setup their POP3 account and test their email account here.
    Property page 2
        User can subscribe security policy here,
        Include
    Mail address filter function - domain name check in "From" field
    Text filter function - filter specific text show up in To, From, Subject or E-mail
Body text
        IF user select "automatic" remove THEN
            Each time email retrieval is done, a security policy operation is executed
            to remove candidate "dangerous" emails from user email account in ISP
            POP3 server.
        END IF
    Property page 3
        User can setup schedule to run automatically
    Property page 4
        User can setup log file recording option.
        Option 1 - automatic capture email information to log file after execute retrieve
email operation
        Option 2 - user clicks toolbar button to capture email information
```

Figure 3:
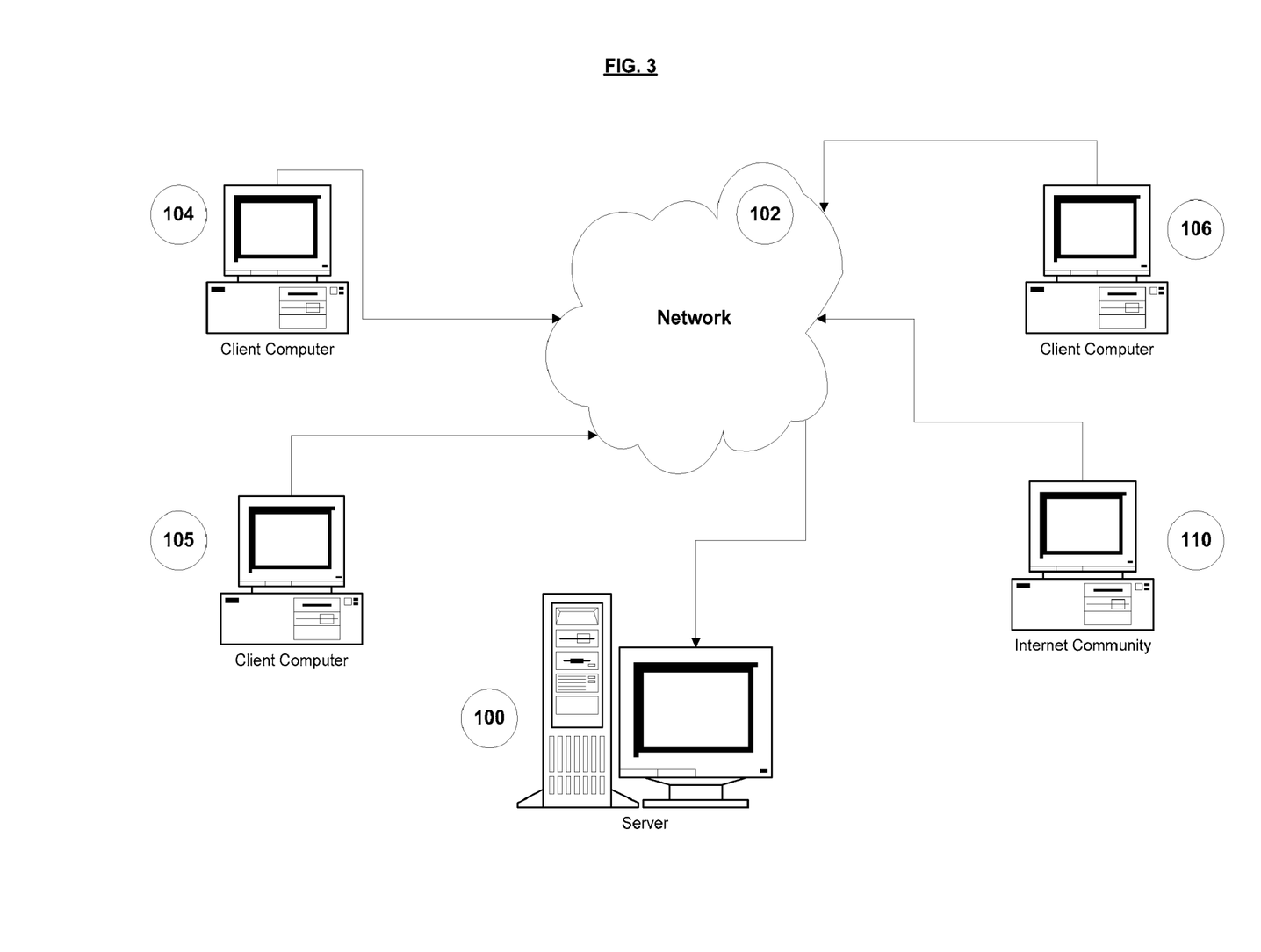
FIG. 3 shows the system of FIGS. 1-2 in a network.

FIG. 3 shows an environment for electronically generating documents, including legal documents. A server 100 is connected to a network 102 such as the Internet. One or more client workstations 104-106 are also connected to the network 102. The client workstations 104-106 can be personal computers, thin clients, or workstations running browsers such as Netscape or Internet Explorer. With the browser, a client or user can access the server 100's Web site by clicking in the browser's Address box, and typing the address (for example, www.mailrancher.com), then press Enter. When the page has finished loading, the status bar at the bottom of the window is updated. The browser also provides various buttons that allow the client or user to traverse the Internet or to perform other browsing functions.

An Internet community 110 with one or more service providers, manufacturers, or marketers is connected to the network 102 and can communicate directly with users of the client workstations 104-106 or indirectly through the server 100. The Internet community 110 provides the client workstations 104-106 with access to a network of anti-virus specialists. For example, members of the Internet community 110 can include consultants who can help the user in recovering from an infection.

Although the server 100 can be an individual server, the server 100 can also be a cluster of redundant servers. Such a cluster can provide automatic data failover, protecting against both hardware and software faults. In this environment, a plurality of servers provides resources independent of each other until one of the servers fails. Each server can continuously monitor other servers. When one of the servers is unable to respond, the failover process begins. The surviving server acquires the shared drives and volumes of the failed server and mounts the volumes contained on the shared drives. Applications that use the shared drives can also be started on the surviving server after the failover. As soon as the failed server is booted up and the communication between servers indicates that the server is ready to own its shared drives, the servers automatically start the recovery process. Additionally, a cluster of servers or server farm can be used. Network requests and server load conditions can be tracked in real time by the server farm controller, and the request can be distributed across the farm of servers to optimize responsiveness and system capacity. When necessary, the farm can automatically and transparently place additional server capacity in service as traffic load increases.

The server 100 can also be protected by a firewall. When the firewall receives a network packet from the network 102, it determines whether the transmission is authorized. If so, the firewall examines the header within the packet to determine what encryption algorithm was used to encrypt the packet. Using this algorithm and a secret key, the firewall decrypts the data and addresses of the source and destination firewalls and sends the data to the server 100. If both the source and destination are firewalls, the only addresses visible (i.e., unencrypted) on the network are those of the firewall. The addresses of computers on the internal networks, and, hence, the internal network topology, are hidden. This is called "virtual private networking" (VPN).

The server 100 supports a document generating portal that provides a single point of integration, access, and navigation through the multiple enterprise systems and information sources facing knowledge users operating the client workstations 104-106. The portal can additionally support services that are transaction driven. Once such service is advertising: each time the user accesses the portal, the client workstation 104 or 106 downloads information from the server 100. The information can contain commercial messages/links or can contain downloadable software. Based on data collected on users, advertisers may selectively broadcast messages to users. Messages can be sent through banner advertisements, which are images displayed in a window of the portal. A user can click on the image and be routed to an advertiser's Website. Advertisers pay for the number of advertisements displayed, the number of times users click on advertisements, or based on other criteria. Alternatively, the portal supports sponsorship programs, which involve providing an advertiser the right to be displayed on the face of the port or on a drop down menu for a specified period of time, usually one year or less. The portal also supports performance-based arrangements whose payments are dependent on the success of an advertising campaign, which may be measured by the number of times users visit a Web-site, purchase products or register for services. The portal can refer users to advertisers' Websites when they log on to the portal.

Additionally, the portal offers contents and forums providing focused articles, valuable insights, questions and answers, and value-added information about anti-virus operations. Other services can be supported as well. For example, a user can rent space on the server to enable him/her to download application software (applets) and/or data—anytime and anywhere. By off-loading the storage on the server, the user minimizes the memory required on the client workstation 104-106, thus enabling complex operations to run on minimal computers such as handheld computers and yet still ensures that he/she can access the application and related information anywhere anytime. Another service is On-line Software Distribution/Rental Service. The portal can distribute its software and other software companies from its server. Additionally, the portal can rent the software so that the user pays only for the actual usage of the software. After each use, the application is erased and will be reloaded when next needed, after paying another transaction usage fee.

Figure 4:
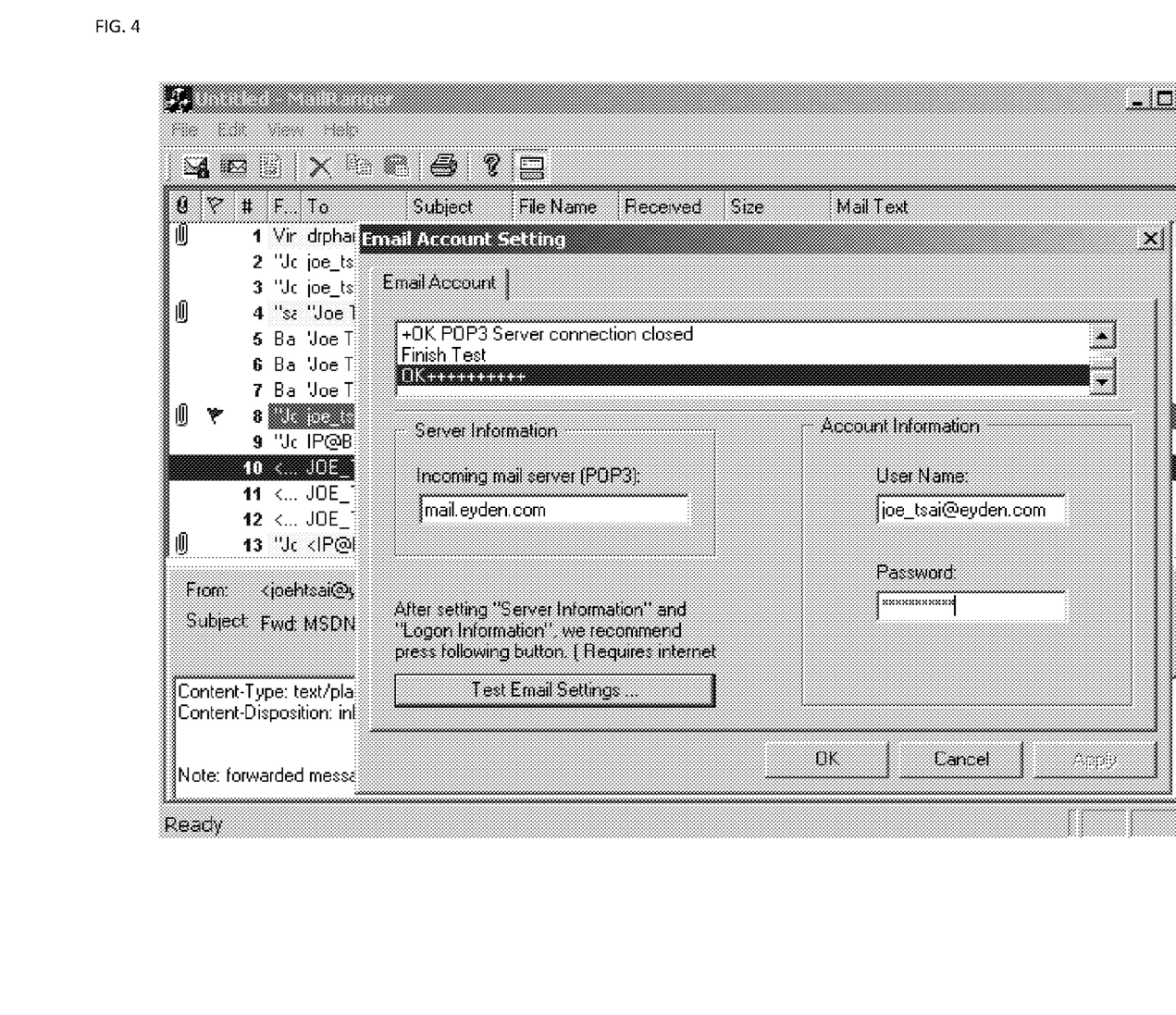
FIGS. 4-5 show various exemplary user interfaces for the anti-virus system of FIG. 1.

FIG. 4 shows an exemplary user interface displaying the status of a mail receiving process. In this example, twelve emails have been received and stored in the user's incoming mail server. The exemplary interface shows that the user's email account has successfully logged-in and the emails are downloaded in a last-in-first-out order. The emails are downloaded in their virtual-copy format data so that they cannot self-executed. Using the system, the user previews the received emails and deletes suspicious emails before the emails are actually downloaded into an email software such as Outlook.

Figure 5:
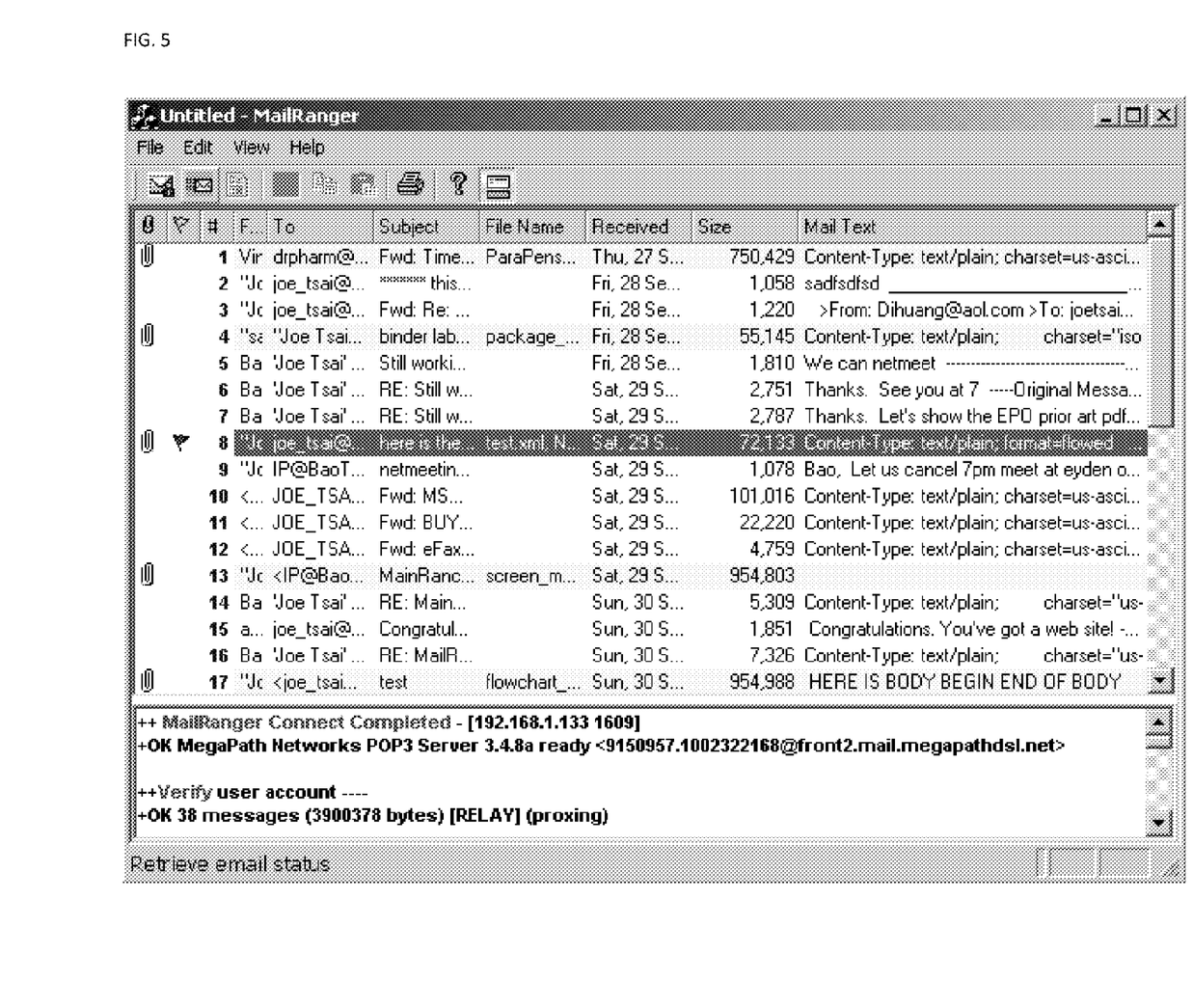

FIG. 5 shows an exemplary user interface for an exemplary email preview operation. In this example, the twelve emails have been downloaded. A clip is shown for each email with an attachment. Moreover, a warning flag is generated for each suspicious email for the user to decide whether that particular email should be deleted beforehand. A checkbox exists for each email so that the user can check off each email that needs to be deleted. Further, an email number ID, the email address of the sender, and email address(es) for all recipients are shown. The sender and recipient information can be helpful in that the user can determine whether the source is suspect. In many cases where the sender is familiar to the user (such as in the case of a virus that accessed the prior victim's address book), the list of recipient can be helpful. For example, a long list of recipients can signify a virus attack. Based on the information provided in the user interface, the user can effectively manage his or her emails to minimize if not avoid virus infections.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for avoiding electronic mail (email) attacks on a computer, comprising:
   downloading to a first email application running on the computer one or more emails in virtual-copy format to prevent the one or more emails from executing;
   determining by the first email application whether a potentially infected email is in the one or more emails; and
   displaying the potentially infected email to a user and providing a user interface to allow the user to select and delete the infected email using the first email application prior to downloading emails to a second email application running on the user's computer.

2. The method of claim 1, further comprising allowing non-infected emails to be accessed.

3. The method of claim 1, further comprising downloading non-infected emails to an email software.

4. The method of claim 3, wherein the email software is Microsoft Outlook.

5. The method of claim 1, further comprising parsing the downloaded virtual-copy format emails to determine whether the emails are secure.

6. The method of claim 1, wherein potentially infected emails are determined based on one or more of the following: an email from field, an email to field, and an email subject field.

7. The method of claim 1, further comprising determining whether a security policy exists.

8. The method of claim 7, wherein the security policy specifies characteristics of potentially infected emails.

9. The method of claim 7, further comprising removing one or more potentially infected emails based on the security policy.

10. The method of claim 1, further comprising displaying a summary for each email.

11. A system for avoiding electronic mail (email) attacks on a computer, comprising:
    means for downloading to a first email application running on the computer one or more emails in virtual-copy format prevent the one or more emails from executing;
    means for determining by the first email application whether a potentially infected email is in the one or more emails; and
    means for displaying the potentially infected email to a user and providing a user interface to allow the user to select and delete the infected email using the first email application prior to downloading emails to a second email application running on the user's computer.

12. The system of claim 11, further comprising means for allowing non-infected emails to be accessed.

13. The system of claim 11, further comprising means for downloading non-infected emails to an email software.

14. The system of claim 13, wherein the email software is Microsoft Outlook.

15. The system of claim 11, further comprising means for parsing the downloaded virtual-copy format emails to determine whether the emails are secure.

16. The system of claim 11, wherein potentially infected emails are determined based on one or more of the following: an email from field, an email to field, and an email subject field.

17. The system of claim 11, further comprising means for determining whether a security policy exists.

18. The system of claim 17, wherein the security policy specifies characteristics of potentially infected emails.

19. The system of claim 17, further comprising means for removing one or more potentially infected emails based on the security policy.

20. The system of claim 11, further comprising code to:
    retrieve emails in raw format and store emails in the virtual-copy format;
    extract e-mail headers including To, From, Subject, Cc, Bcc, Attachment and Body text;
    diagnose the headers To, From and Subject data to detect a virus pattern or behavior; and
    diagnose an attachment file to detect any potential auto run pattern or behavior.

* * * * *